3,830,762
POLYSACCHARIDE-CONTAINING ELASTOMERS
Thomas P. Abbott, Peoria, Ill., assignor to the United States of America as represented by the Secretary of Agriculture
No Drawing. Filed Aug. 24, 1973, Ser. No. 391,190
Int. Cl. C08c 9/12; C08d 9/06; C08f 45/14
U.S. Cl. 260—17.2          14 Claims

ABSTRACT OF THE DISCLOSURE

Elastomer compositions prepared by an improved polysaccharide-elastomer coprecipitation method are storage-stable powders which are capable of being formed into vulcanized rubber articles by injection molding or other similar methods without prior high shear mixing. Such vulcanizates have the improved properties previously associated only with extrusion-processed polysaccharide-reinforced rubbers.

---

A nonexclusive, irrevocable, royalty-free license in the invention herein described, throughout the world for all purposes of the United States Government, with the power to grant sublicenses for such purposes, is hereby granted to the Government of the United States of America.

BACKGROUND OF THE INVENTION

This invention relates to improved elastomer compositions and to an improved method for their preparation. More specifically, the invention relates to polysaccharide-elastomer coprecipitate compositions and methods of their preparation which are extensions of and improvements over the compositions and methods described in commonly assigned U.S. Pats. 3,442,832, Cl. 260–17.4; 3,480,572, Cl. 260–172; 3,645,940, Cl. 260–17.4 BB; 3,673,136, Cl. 260–17.4 BB; and 3,714,087, Cl. 260–17.2 which are incorporated herein by reference.

Polysaccharide-elastomer coprecipitates are obtained by now well-known procedures for simultaneously cross-linking polysaccharide and destabilizing elastomer particles in mixtures of polysaccharide solutions with latices (U.S. Pats. 3,442,832 and 3,480,572, supra). Such polysaccharide-elastomer coprecipitates are oven dried to give hard curds in which dry polysaccharide constitutes the continuous phase and elastomer particles the discontinuous phase. Extensive high shear mixing of dry coprecipitate on a differential roll mill or other similar machine accomplishes a phase inversion giving a useful polysaccharide-elastomer masterbatch in slab form. After phase inversion is accomplished by mastication, the polysaccharide is present as a fine particle dispersion in an elastomer matrix and thus performs as a reinforcing agent.

In U.S. 3,645,940 (supra), a method was disclosed which resulted in elastomer masterbatches in slab form which had greatly increased improved elastic and strength properties. However, this required difficult, stepwise, hot extrusion processing of the wet polysaccharide-elastomer coprecipitate.

In U.S. 3,673,136 and 3,714,087 (supra), a method for producing powdered polysaccharide-elastomer masterbatches was disclosed in which dry coprecipitates were comminuted to a powder before the all important phase inversion had been accomplished. An additive was used to prevent reagglomeration after comminuting. These powdered compositions have the advantage of being able to form finished vulcanized rubber products by direct hot-pressure molding or extrusion without prior high shear mixing. Curatives and other additives can be mixed with the powdered coprecipitates in a simple powder blender which requires much less time and energy than the high shear milling or mixing equipment required by the prior art products. However, vulcanized rubber products formed from the powdered compositions lack the improved elasticity and strength that was achieved by the wet extrusion process described in U.S. 3,645,940, supra. The comminuting process required to produce the powdered composition is costly and requires precise production control.

It is an objective of this invention to provide powdered polysaccharide-elastomer masterbatch compositions which do not need additives to prevent reagglomeration and that can be formed directly into vulcanized rubber articles by either hot-pressure molding or extrusion without prior high shear mixing while retaining tensile strengths and elasticities equal to or greater than those provided by similar prior art products.

It is also an object of this invention to provide a more facile process for making improved polysaccharide-elastomer masterbatch compositions by avoiding the requirement for extensive mechanical working with steam in a closed machine.

Another object of the invention is to provide a more facile process for making powdered polysaccharide-elastomer masterbatch compositions by eliminating the necessity for comminution.

In accordance with the above-mentioned objects, I have discovered an improved process for preparing polysaccharide-elastomer masterbatch compositions of the type wherein a starch derivative is coprecipitated with elastomer and the reaction mixture filtered to give a wet coprecipitate. The improvement comprises washing and filtering the wet coprecipitate with a water miscible solvent until the filtrate contains from about 0 to 10 percent water.

Powdered polysaccharide-elastomer masterbatch compositions prepared according to the invention have the advantage of being greatly superior to those of the prior art as delineated by the above objects.

A possible reason for this unexpected superiority is revealed by electron microscopy of vulcanizates from the respective powdered masterbatches. Electron microscopy reveals that the instant process results in much finer particle size distributions and more irregularly shaped particles of reinforcing polysaccharide than are obtained by the prior art method of making powdered elastomers (i.e., U.S. 3,673,136 and 3,714,087, supra). These differences in shape and size of polysaccharide-reinforcing particles were unexpected and remain unexplained.

Another unexpected advantage afforded by the alcohol-dehydration procedure is that powders prepared by this method are considerably more resistant to caking upon prolonged storage or upon compression during storage than the prior art powdered polysaccharide-elastomer masterbatches.

DETAILED DESCRIPTION OF THE INVENTION

The basis of the instant invention lies in the step of washing wet, latex-polysaccharide coprecipitates with a water miscible solvent. This act, which is essentially a dehydration, prevents reagglomeration of the starch-encased elastomer particles after the composition has been dried. The coprecipitation can be accomplished by any of the methods disclosed in U.S. Pats. 3,442,832; 3,480,572; 3,645,940; 3,673,136; and 3,714,087, supra.

The preferred starting materials for the wet coprecipitate including the following:

1. Elastomer (i.e. rubber) latex: natural, styrene-butadiene (SBR), acrylonitrile-butadiene (NBR), neoprene, polybutadiene, and oil-extended SBR [see Kirk and

*Othmer Encyclopedia of Chemical Technology,* Vol. 7, pp. 676–716, and Vol. 17, pp. 660–684, The Interscience Encyclopedia, Inc., New York (1965) for a discussion of natural and synthetic elastomers];

2. Polysaccharides: starch xanthate, zinc starch xanthate, cationic starches such as aminoalkyl and quaternary ammonium alkyl ether derivatives of starch [see *Starch: Chemistry and Technology,* ed. Wistler and Paschall, Vol. II, Chapter 16, Academic Press, New York (1967)], cationic strch graft copolymers of the type described in U.S. 3,669,915, and cereal flour analogs of the above;

3. Precipitation reagents: $ZnSO_4$, $ZnCl_2$, or the equivalent mineral acid.

It is preferred that the coprecipitates contain from 2.5 to 100 phr. polysaccharide. Phr. is herein defined as parts per hundred parts of rubber (i.e., elastomer) solids on a dry basis. Although phr.'s will be reported as phr. of substituted starch, they will be calculated on a starch basis. The upper limit on polysaccharide loading is determined by products preference. More than about 100 phr. gives harder vulcanizates having lower elongation values than those compositions containing 20–45 phr. polysaccharide. However, uses for these harder rubber products will be obvious to those skilled in the art. Polysaccharide loadings of 2.5 phr. add little reinforcement to the final rubber products so that rubbers made from the low-load compositions have essentially the same physical properties as rubbers made from latex alone. However, masterbatch compositions containing 2.5 phr. polysaccharides retain the great advantage of being nonagglomerated powders in accordance with the objects of the invention.

The preferred starch xanthate degrees of substitution (D.S.) are from about 0.05 to 3.0.

Wet polysaccharide-elastomer coprecipitates are defined as those compositions which have been coprecipitated as described above, have had the aqueous reaction medium removed therefrom, have been washed with water, and have had the water removed therefrom. In this instance, the removal of reaction medium and water means that the coprecipitate has been centrifuged, filtered, squeezed, or treated by other similar methods, but has not been dried. Wet coprecipitates in accordance with this definition contain residual water.

For dehydration of polysaccharide-elastomer coprecipitate, any water miscible alcohol or other completely water miscible solvent such as acetone, methyl ethyl ketone, isopropanol, dimethyl sulfoxide, tetrahydrofuran, ethanol, or dioxane. However, methanol or ethanol is preferred because of their economy, ready availability, and particularly their ease of recovery from aqueous solution for recycle in the process. Temperature for the dehydration is not critical; it is convenient to work in the range below the boiling point of the solvent or under ambient conditions. Enough water must be extracted from the coprecipitate to prevent agglomeration during filtration and drying and this amount depends upon polysaccharide content of the coprecipitate and upon processing conditions. If the coprecipitate contains more than 10 percent water by weight after the first water miscible solvent washing step, the washing step was repeated until the coprecipitate contains from 0 to 10 percent water by weight. Solvents used for the first washing step can contain up to 40 percent water by weight. This allows solvents from subsequent washings to be recycled back to the first washing step in a continuous or semicontinuous operation.

After dehydration, the solid products are very readily recovered by most conventional filtration, centrifugation, or decantation methods. Products may then be dried in conventional forced draft or vacuum ovens. However, fluidized bed drying is preferred because of its rapidity and economy, because it is a continuous process, and especially because it allows simultaneous classification of powders into fine and coarse fractions. Coarse fractions from fluidized bed drying may be hammermilled, then recombined with the fine fractions with little deleterious effect on the product.

Particle size distribution in powdered polysaccharide-elastomers is a matter of product preference depending upon storage, handling, and end use of the material. In general, powders with very fine particle sizes are desirable for uniformity in mixing and subsequent fabrication; but powders of coarser particle sizes are easier to transport by bulk handling methods and are more resistant to caking under compression during storage. For many applications, powdered polysaccharide-elastomers with median particle diameters of about $800\mu$ are preferred, although the invention conveniently affords powders with median sizes down to about $200\mu$. Powders with even finer size distribtuions can be provided by air classification, screening, grinding, and combination of coarse fractions, and the usual techniques of powder technology.

Polysaccharide-elastomer masterbatch compositions of the instant invention are compounded with the normal rubber additives. Polysaccharides alone function as reinforcing agents, but a combination of polysaccharides and one or more other reinforcing agents or fillers is preferred. Additives useful for compounding with the instant compositions include carbon black, lignin, phenolic resins, sulfur, zinc oxide, organic dyes, clay, reinforcing silica, vulcanization agents, lubricants, antioxidants and plasticizers.

Compounding of this invention's powdered polysaccharide-elastomer masterbatches may be accomplished by mixing in V or ribbon blenders if the added ingredients are fine powders. If flaked, pelletized, or encapsulated ingredients are added, high-speed rotary blade powder mixers of the Waring or Henschel type are preferred. Many rubber compounding ingredients can be incorporated into the powdered masterbatches by adding them to the polysaccharide solution-latex mixture before coprecipitation. It is particularly advantageous to incorporate lignin, phenolic resins, and carbon blacks in this way. Precaution is necessary when antioxidants and plasticizers are added before coprecipitation as water miscible solvent-soluble materials can be extracted and lost during the subsequent dehydration procedure. These soluble ingredients of the latex suspension, which normally remain in the coprecipitate and are useful in the finished rubber (e.g., stearic acid), can be added back to the composition after the solvent wash. The powdered elastomer compounds of this invention may be shaped into compression mold blanks or into fully fabricated articles by direct extrusion from powder feed. They may also be fabricated directly from powdered compound by high-speed automatic injection molding, but for this a screw plasticator injection molding machine would be preferred over a ram operated type.

Vulcanized rubbers prepared from the instant solvent dehydrated polysaccharide-elastomer masterbatch compositions were compared to vulcanized rubbers prepared from polysaccharide-elastomer masterbatch compositions which were prepared according to the prior art (i.e., U.S. 3,645,940 and 3,673,136).

Rubber specimens made from solvent dehydrated masterbatches contain polysaccharide particles of jagged irregular shape of median diameter about $0.1\mu$. The polysaccharide particles in specimens from hammermill ground powders are less irregular in shape and much larger with median diameters of about $0.3\mu$ and with a significant number of larger indistinct particles of nearly $1\mu$ diameter. Polysaccharide particles in specimens from extrusion-processed slabs are smooth and regular ovoid in shape and are slightly larger, about $0.15\mu$ median diameter, than those in specimens from solvent dehydrated powders. For reasons not completely understood, the above differences in polysaccharide particle size and shape are apparently responsible for the improved properties of compositions prepared according to the invention.

The following examples are included to further illustrate the invention and are not to be construed as limitations thereto. Each specific elastomer latex disclosed in the examples will be designated by its ASTM designation (e.g., SBR 1502, neoprene 571, etc.), and all rubber testing will be done by ASTM standard methods [*1969 Book of ASTM Standards*, Part 28, American Society for Testing and Materials, Philadelphia, Pa. (1969)]

EXAMPLES 1–5

Starting materials were SBR 1502 latex containing 21.6 percent total solids, and a 9.1 percent aqueous starch xanthate solution with xanthate D.S. 0.06, and total sodium hydroxide to starch mole ratio of 0.5.

For a starch xanthide-SBR 1502 masterbatch containing 45 phr. starch xanthide, a homogeneous mixture was prepared by stirring 927 g. of the SBR 1502 latex with 989 g. of the starch xanthate solution. Then 3.8 g. of sodium nitrite was dissolved in 50 ml. of water and added, followed by dropwise addition of a dilute sulfuric acid solution until the mixture reached pH 4.0. This treatment quantitatively coprecipitated starch xanthide and SBR as curd particles which were collected on a cloth filter, then washed by slurrying in water and again collecting on a filter.

The coprecipitate was then suspended in ethanol with vigorous stirring for a few seconds to separate and partially dehydrate the individual coprecipitate particles. The coprecipitate was separated from the now wet alcohol by filtration, then resuspended in dry ethanol and stirred a few minutes to complete its dehydration. Extent of dehydration was determined by stirring the alcohol-coprecipitate slurry for a time sufficient to equilibrate the remaining water with the alcohol. The specific gravity of the filtrate was then compared to known alcohol-water mixtures. The alcohol dehydration step was repeated until the filtrate contains from 0 to 10 percent by weight water. The powdered product was then collected and dried at 70° C. in a vacuum oven to remove alcohol and residual water.

Other alcohol dehydrated starch xanthide-SBR 1502 powders were prepared by the above procedure except that different ratios of starch xanthate solution to latex were taken so as to give masterbatches containing 10, 20, 30 phr. starch xanthide (xanthate D.S. 0.06), and 2.5 phr. starch xanthide (xanthate D.S. 0.35).

Screen analyses of these powders without additives or other modification are reported in Table 1.

Two starch xanthide-SBR 1502 masterbatches containing 45 phr. starch xanthide (xanthate D.S. 0.06) were made by prior art methods for comparison with the above products. Control 1 was a powdered masterbatch made by oven drying an undehydrated wet coprecipitate and hammermilling, and Control 2 was a slab masterbatch made by hot extrusion processing of coprecipitate initially containing 20 percent moisture.

The two prior art masterbatches and the masterbatches of Example 1 were compounded following recipe 1B, ASTM D15–68a. Powdered compounds were mixed for 30 sec. at high speed in a Waring Blender, but the extrusion-processed slab had to be mixed by the usual differential-roll-mill method.

Powdered compounds were then consolidated into mold blanks for ASTM tensile test specimens by passing through a tight nip on the differential-roll-mill for three passes, then sheeting out to the required thickness with a minimum of further milling. This mold blank forming process required less than 10 percent of the high shear milling needed for mixing and sheeting out the extrusion-processed sample.

Test specimens were prepared by press curing according to ASTM D15–68a standard method at the optimum degree of cure. The test specimens were then tested for 300 percent modulus (i.e., tensile stress at 300% elongation), ultimate elongation, tensile strength, and tensile set by ASTM standard method D412–68, Table 2.

TABLE 1

| Example No. | Starch xanthate | | Particle size, percent on screen | | | | | | |
|---|---|---|---|---|---|---|---|---|---|
| | Phr. | D.S. | 4,760μ | 2,380μ | 1,410μ | 840μ | 590μ | 420μ | 420μ |
| 1 | 45 | 0.06 | 0 | 0 | 50 | | 14 | 24 | 12 |
| 2 | 30 | 0.06 | 0 | 0 | 34 | | 54 | 11 | 1 |
| 3 | 20 | 0.06 | 0 | 53 | 33 | | 10 | 4 | 0 |
| 4 | 10 | 0.06 | 0 | 32 | 61 | | 6 | 1 | 0 |
| 5 | 2.5 | 0.35 | 39 | 43 | 12 | 6 | 0 | 0 | 0 |
| 8 | 20 | 0.07 | 1 | 34 | 27 | 33 | 5 | 0 | 0 |
| 12 | 3 | 1.28 | 23 | 23 | 17 | 36 | 1 | 0 | 0 |

TABLE 2

| Masterbatch | 300% modulus, p.s.i. | Ultimate elongation, percent | Tensile strength, p.s.i. | Tension set at break, percent | Hardness, IRHD units [1] | Rebound, percent [2] |
|---|---|---|---|---|---|---|
| Control 1 | | 260 | 1,620 | 33 | | |
| Control 2 | 2,010 | 320 | 2,100 | 8 | | |
| Example 1 | 1,800 | 380 | 2,300 | 26 | | |
| Example 6 | 2,200 | 310 | 2,270 | 28 | | |
| Example 7 | | 80 | 1,420 | 5 | 84 | 60 |
| Example 8 | 1,160 | 300 | 1,160 | 10 | 75 | 42 |
| Example 13 | | 190 | 800 | | | |
| Example 14 | 800 | 590 | 1,600 | 25 | | |
| Example 15 | 1,750 | 420 | 2,370 | 40 | | |
| Example 16 | 2,100 | 350 | 2,480 | 32 | | |
| Example 17 | 1,890 | 380 | 2,350 | 40 | | |
| Example 18 | 2,120 | 360 | 2,480 | 32 | | |

[1] ASTM D1415–68.  [2] ASTM D2632–67.

Rubber specimens of Control 1, Control 2, and Example 1 were hardened by immersing them in molten sulfur at 120° C. for 24 hr. The specimens were then microtomed and photomicrographed at 20,000 times magnification by a transmission electron microscope, Table 3.

TABLE 3

| Specimen | Shape | Median diameter, μ |
|---|---|---|
| Control 1 | Irregular | 0.3–1 |
| Control 2 | Smooth, regular, ovoid | 0.15 |
| Example 1 | Jagged, very irregular | 0.1 |

EXAMPLE 6

Powdered starch xanthide-SBR 1502 masterbatch compositions containing 20 phr. starch xanthide (xanthate D.S. 0.07) were prepared and compounded (Table 4) as described in Example 1.

TABLE 4

| Ingredients: | Parts |
|---|---|
| 20 phr. starch-rubber powder | 198 |
| IRB No. 1 (carbon black) | 68 |
| Phenyl-β-naphthylamine | 1.6 |
| Processing oil (ASTM type No. 103 extender oil) | 11 |
| Stearic acid | 1.7 |
| Mineral rubber | 16.7 |
| Zinc oxide | 8.3 |
| Sulfur | 4.3 |
| Mercaptobenzothiazyl disulfide | 2.9 |
| Diorthotolylguanidine | 1.25 |

The above combined ingredients were extruded at 100° to 125° C. in a 20:1 L/D Brabender extruder using a 3:1 compression ratio screw and a 0.070-in. ribbon die at the exit. The sample was extruded two times under the same conditions and the resulting ribbon was cured and tested as in Example 1 (Table 2).

EXAMPLE 7

A fine powdered starch xanthide-natural rubber masterbatch composition containing 100 phr. starch xanthide (xanthate D.S. 0.07) was prepared and compounded (Table 5) as described in Example 1.

TABLE 5

| Ingredients: | Parts |
|---|---|
| Masterbatch | 150 |
| Zinc oxide | 4.5 |
| Sulfur | 2.6 |
| Stearic acid | 2.4 |
| N-cyclohexyl-2-benzothiazyl-sulfenamide | 4.0 |
| Tetramethylthiuram disulfide | 0.4 |
| 2-Mercaptobenzothiazole | 0.4 |

Tensile sheets prepared from the compounded mixture of Table 5 were cured and tested as described in Example 1 (Table 2).

EXAMPLE 8

A powdered starch xanthide—oil-extended SBR 1713 masterbatch composition containing 50 phr. ASTM type 103 extender oil and 20 phr. starch xanthide (xanthate D.S. 0.07) was prepared and compounded (Table 6) as described in Example 1. A sieve analysis was obtained before compounding, Table 1.

TABLE 6

| Ingredients: | Parts |
|---|---|
| Masterbatch | 120 |
| Diethylene glycol | 30 |
| Triethanolamine | 1 |
| Diethyldithiocarbamate | 0.75 |
| Processing oil (ASTM type No. 103 extender oil) | 10 |
| Stearic acid | 1.5 |
| Zinc oxide | 1.5 |
| Sulfur | 1.75 |
| Benzothiazole disulfide | 1.75 |

Tensile sheets prepared from the compounded mixture of Table 4 were cured and tested as described in Example 1 (Table 2).

EXAMPLE 9

A powdered starch xanthide-neoprene 571 rubber masterbatch composition containing 20 phr. starch xanthide (xanthate D.S. 0.07) was prepared as described in Example 1. A coarse nonsticky powder resulted.

EXAMPLE 10

A powdered starch xanthide emulsion-polybutadiene rubber masterbatch composition containing 5 phr. starch xanthide (xanthate D.S. 0.35) was prepared as described in Example 1.

Rubber prepared from the powdered masterbatch described above was tested for Mooney viscosity (ASTM D1646) and compared to an emulsion-polybutadiene rubber (EBR) without starch xanthide prepared by standard methods, Table 7.

TABLE 7

| Rubber: | Mooney viscosity |
|---|---|
| Example 10 masterbatch | 106-ML 1+4 (100 C) |
| EBR | 103-ML 1+4 (100 C) |

EXAMPLE 11

A powdered starch xanthide-SBR 1502 masterbatch 1092–30 rubber masterbatch composition containing 5 phr. starch xanthide (xanthate D.S. 0.35) was prepared as described in Example 1. The resulting fine powder was slightly tacky but breaks up well when compounded. Mooney viscosities were determined as described in Example 10 (Table 8).

TABLE 8

| Rubber: | Mooney viscosity |
|---|---|
| Example 11 masterbatch | 45-ML 1+4 (100 C) |
| Example 11 masterbatch +5 phr. stearic acid | 30-ML 1+4 (100 C) |
| Butadiene-acrylonitrile 1092–30 | 30-ML 1+4 (100 C) |

EXAMPLE 12

A powdered starch xanthide-SBR 1502 masterbatch composition 3 phr. starch xanthide (xanthate D.S. 1.28) was prepared as described in Example 1 and a sieve analysis obtained, Table 1.

EXAMPLE 13

A powdered starch xanthide-SBR 1502 masterbatch composition containing 50 phr. starch xanthide (xanthate D.S. 3.0) was prepared and compounded following recipe 1B, ASTM D15–68a as described in Example 1.

Tensile sheets prepared from the compounded mixture were cured and tested as described in Example 1 (Table 2).

EXAMPLE 14

Fifty-five grams of a commercial cationic starch (i.e., a tertiary amino alkyl ether derivative of starch) was dissolved in 1,000 ml. of water by heating to 75° C. The cationic starch solution plus a small amount of ethanol (about 400 ml. to aid coagulation) was added to 500 g. of butadiene-acrylonitrile 1052 rubber latex (22.1% solids). The resulting coprecipitate was then filtered, washed once with water and filtered, washed once with ethanol and filtered, and dried in a vacuum oven at 20° C. The resulting powdered mastermatch was compounded according to the ASTM D15–68a procedure with no additional fillers and tested as described in Example 1 (Table 2).

EXAMPLES 15–18

Powdered starch xanthide-SBR 1502 masterbatches containing 45 phr. starch xanthide (D.S. 0.06) were prepared and compounded as described in Example 1, except the dehydrating solvent and method of drying was varied as follows:

| Example | Dehydrating solvent | Driving method |
|---|---|---|
| 15 | Ethanol | Forced draft oven. |
| 16 | do | Vacuum oven. |
| 17 | do | Fluidized bed. |
| 18 | Methanol | Vacuum oven. |

Tensile sheets prepared from the above compounded mixture were cured and tested as described in Example 1 (Table 2).

I claim:
1. In a process for preparing polysaccharide-elastomer masterbatch compositions of the type wherein a starch derivative is coprecipitated with elastomer latex solids and the reaction mixture filtered to give a wet coprecipitate an improvement comprising the following steps:

a. washing said wet coprecipitate with a water miscible solvent;
b. filtering the washed coprecipitate; and
c. repeating steps (a) and (b) until the filtrate resulting from step (b) contains from 0 to 10 percent by weight water.

2. In a process for preparing polysaccharide-elastomer masterbatch compositions as defined in Claim 1 the improvement comprising washing said wet coprecipitate as in step (a) with a water miscible solvent selected from the group consisting of methanol, ethanol, acetone, isopropanol, dimethyl sulfoxide, tetrahydrofuran, and dioxane.

3. A polysaccharide-elastomer masterbatch composition prepared by the process defined in Claim 1.

4. A process for preparing polysaccharide-elastomer masterbatch compositions comprising the steps of:
a. coprecipitating a polysaccharide selected from the group consisting of starch xanthide, cationic starch, zinc starch xanthate, and their cereal flour analogs with solids contained in an elastomer latex selected from the group consisting of natural rubber latex, styrene-butadiene rubber latex, butadiene-acrylonitrile rubber latex, oil-extended styrene-butadiene rubber latex, and phenol-formaldehyde extended nitrile rubber latex;
b. filtering the resulting coprecipitate;
c. washing the filtered coprecipitate resulting from step (b) with a water miscible solvent;
d. filtering the washed coprecipitate resulting from step (c); and
e. repeating steps (c) and (d) until the filtrate resulting from step (d) contains from 0 to 10 percent by weight water.

5. A process for preparing polysaccharide-elastomer masterbatch compositions as defined in Claim 4 wherein the water miscible solvent disclosed in step (c) is selected from the group consisting of methanol, ethanol, acetone, isopropanol, dimethyl sulfoxide, tetrahydrofuran, and dioxane.

6. A process for preparing polysaccharide-elastomer masterbatch compositions as defined in Claim 4 wherein the polysaccharide of step (a) is starch xanthide having a xanthate degree of substitution of from about 0.5 to 3.0.

7. A process for preparing polysaccharide-elastomer masterbatch compositions as defined in Claim 4 wherein the polysaccharide of step (a) is zinc starch xanthate having a xanthate degree of substitution of from about 0.5 to 3.0.

8. A process for preparing polysaccharide-elastomer masterbatch compositions as defined in Claim 4 wherein from 2.5 to 100 parts of polysaccharide based on dry starch weight is coprecipitated with 100 parts of elastomer latex solids based on dry weight.

9. A process for preparing polysaccharide-elastomer masterbatch compositions as defined in Claim 4 wherein from 2.5 to 45 parts of polysaccharide based on dry starch weight is coprecipitated with 100 parts of elastomer latex solids based on dry weight.

10. A process for preparing polysaccharide-elastomer masterbatch composition as defined in Claim 9 wherein the polysaccharide is starch xanthide having a xanthate degree of substitution from 0.05 to 3.0.

11. A polysaccharide-elastomer masterbatch composition prepared by the process defined in Claim 4.

12. Powdered polysaccharide-elastomer masterbatch compositions containing from about 2.5 to 100 parts based on dry weight of a polysaccharide selected from the group consisting of starch xanthide, zinc starch xanthate, cationic starch, and their cereal flour analogs and 100 parts based on dry weight of elastomer selected from the group consisting of natural rubber, styrene-butadiene rubber, butadiene-acrylonitrile rubber, oil-extended styrene-butadiene rubber, and phenol-formaldehyde extended nitrile rubber, said powdered polysaccharide-elastomer masterbatch compositions having particle sizes from $420\mu$ to $4,700\mu$, and which provide vulcanized rubbers containing, dispersed throughout the rubber, polysaccharide particles having jagged irregular shapes and median diameters of about $0.1\mu$.

13. Powdered polysaccharide-elastomer masterbatch compositions as defined in Claim 12 which contain from 2.5 to 45 parts of polysaccharide based on dry starch weight.

14. Powdered polysaccharide-elastomer masterbatch compositions as defined in Claim 12 wherein the polysaccharide is starch xanthide or zinc starch xanthate having a xanthate degree of substitution of from 0.05 to 3.0.

References Cited

UNITED STATES PATENTS

| | | | |
|---|---|---|---|
| 3,296,158 | 1/1967 | Dimitri | 260—17.5 |
| 3,442,832 | 5/1969 | Buchanan et al. | 260—17.4 |
| 3,645,940 | 2/1972 | Stephens et al. | 260—17.4 |
| 3,673,136 | 6/1972 | Buchanan et al. | 260—17.4 |
| 3,714,087 | 1/1973 | Buchanan et al. | 260—17.2 |

WILLIAM H. SHORT, Primary Examiner

E. WOODBERRY, Assistant Examiner

U.S. Cl. X.R.

260—17.4 BB, 17.4 ST, 742, 749